United States Patent
Florencio

(10) Patent No.: US 6,310,919 B1
(45) Date of Patent: Oct. 30, 2001

(54) METHOD AND APPARATUS FOR ADAPTIVELY SCALING MOTION VECTOR INFORMATION IN AN INFORMATION STREAM DECODER

(75) Inventor: Dinei Afonso Ferreira Florencio, Plainsboro, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/160,789

(22) Filed: Sep. 25, 1998

Related U.S. Application Data

(60) Provisional application No. 60/084,632, filed on May 7, 1998.

(51) Int. Cl.$^7$ ................................................ H04B 1/66
(52) U.S. Cl. ...................................... 375/240.16; 382/298
(58) Field of Search .......................... 375/240.16, 240.13, 375/240.02, 240.15, 240.17, 240.14; 348/402.1, 441, 416.1, 419.1, 431.1, 440.1, 716, 452; 382/232, 236, 298

(56) References Cited

U.S. PATENT DOCUMENTS

| | | | |
|---|---|---|---|
| 5,177,610 | * 1/1993 | Wilkinson | 348/452 |
| 5,257,102 | * 10/1993 | Wilkinson | 348/441 |
| 5,262,854 | 11/1993 | Ng | 358/133 |
| 5,280,351 | * 1/1994 | Wilkinson | 375/240.14 |
| 5,355,328 | 10/1994 | Arbeiter et al. | 364/724.1 |
| 5,485,279 | * 1/1996 | Yonemitsu et al. | 375/240.02 |
| 5,675,387 | * 10/1997 | Hoogenboom et al. | 375/240.15 |
| 6,075,906 | * 6/2000 | Fenwick et al. | 382/298 |
| 6,175,592 | * 1/2001 | Kim et al. | 375/240 |

FOREIGN PATENT DOCUMENTS 0 753 967 A2   6/1996   (DE).

* cited by examiner

Primary Examiner—Chris Kelley
Assistant Examiner—Gims Philippe
(74) Attorney, Agent, or Firm—William J. Burke

(57) ABSTRACT

A method and apparatus for reducing memory and memory bandwidth requirements in an MPEG-like decoder by compressing image information prior to storage such that a reduced resolution image information frame is stored and subsequently utilized by, e.g., a motion compensation module of the decoder. The invention responsively processes motion vector information in a manner consistent with the amount of compression imparted to a predicted image information frame, and the type of prediction employed in forming the predicted information frame.

14 Claims, 4 Drawing Sheets

METHOD AND APPARATUS FOR ADAPTIVELY SCALING MOTION VECTOR INFORMATION IN AN INFORMATION STREAM DECODER

This application claims the benefit of U.S. Provisional Application No. 60/084,632, filed May 7, 1998.

The invention relates to communications systems generally and, more particularly, the invention relates to a method and apparatus for adaptively scaling motion vector information in an information stream decoder, such as an MPEG-like video decoder.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffinan coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra-and/or inter-frame motion compensation encoding.

In a typical MPEG decoder, predictive coded pixel blocks (i.e., blocks that comprise one or more motion vectors and a residual error component) are decoded with respect to a reference frame (i.e., an anchor frame). The anchor frame is stored in an anchor frame memory within the decoder, typically a dual frame memory. As each block of an anchor frame is decoded, the decoded block is coupled to a first portion of the dual frame memory. When an entire anchor frame has been decoded, the decoded blocks stored in the first portion of the dual frame memory are coupled to a second portion of the dual frame memory. Thus, the second portion of the dual frame memory is used to store the most recent full anchor frame, which is in turn used by a motion compensation portion of the decoder as the reference frame for decoding predictive coded blocks.

To reduce the amount of memory required to implement the above anchor frame memory, it is known to compress (i.e., resize) anchor frame image information prior to storage in the anchor frame memory. To ensure accurate prediction using such resized reference image information, it is necessary to correspondingly resize the prediction motion vectors that will utilize the resized reference image information. Present arrangements providing such resizing of images and related motion vector information do not produce satisfactory results under all conditions. Specifically, present arrangements do not function properly in the presence of field prediction encoded macroblocks including inter-field motion vectors.

Therefore, it is seen to be desirable to provide a method and apparatus that significantly reduces the memory and memory bandwidth required to decode a video image while substantially retaining the quality of a resulting full-resolution or downsized video image. Specifically, it is seen to be desirable to provide such a reduction in memory and memory bandwidth even in the presence of field-predictive encoded macroblocks.

SUMMARY OF THE INVENTION

The invention comprises a method and apparatus for reducing memory and memory bandwidth requirements in an MPEG-like decoder. Memory and memory bandwidth requirements are reduced by compressing image information prior to storage such that a reduced resolution image information frame is stored and subsequently utilized by, e.g., a motion compensation module of the decoder. The invention processes motion vector information in a manner consistent with the amount of compression imparted to a predicted image information frame, and the type of prediction employed in forming the predicted information frame.

Specifically, in a block-based system for decoding a compressed information stream including predicted pixel blocks having associated motion vector information, a method according to the invention for adapting said motion vector information to a scaling factor associated with scaled pixel block reference information, comprising the steps of: identifying an encoding mode of a predicted pixel block; scaling, using said scaling factor, a horizontal displacement parameter of each motion vector associated with said predicted pixel block; and in the case of a field prediction encoding mode including an inter-field motion vector prediction: imparting, to a vertical displacement parameter of said motion vector associated with said predicted pixel block, a first offset; scaling, using said scaling factor, said offset vertical displacement parameter; and imparting, to said scaled offset vertical displacement parameter, a second offset.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a video decoder, illustratively an MPEG-2 video decoder. However, it will be apparent to those skilled in the art that the invention is applicable to any video processing system, including those systems adapted to DVB, MPEG-1, MPEG-2 and other information streams. The invention is particularly well suited to systems utilizing inter-field motion vector prediction.

Specifically, the invention will be primarily described within the context of an MPEG-like decoding system that receives and decodes a compressed video information stream IN to produce a video output stream OUT. The invention operates to reduce memory and memory bandwidth requirements in the MPEG-like decoder by compressing image information prior to storage such that a reduced resolution image information frame is stored and subsequently utilized by, e.g., a motion compensation module of the decoder. The invention processes motion vector information in a manner consistent with the amount of compression imparted to a predicted image information frame, and the type of prediction employed in forming the predicted information frame.

Figure 4A:
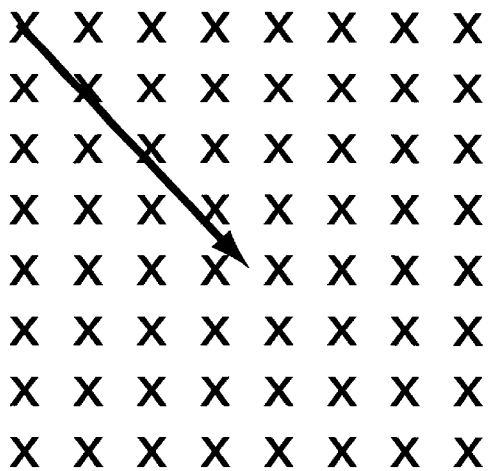
FIG. 4A is graphical depiction of an 8×8 non-interlaced pixel block having an associated frame-prediction mode motion vector.
Figure 4B:
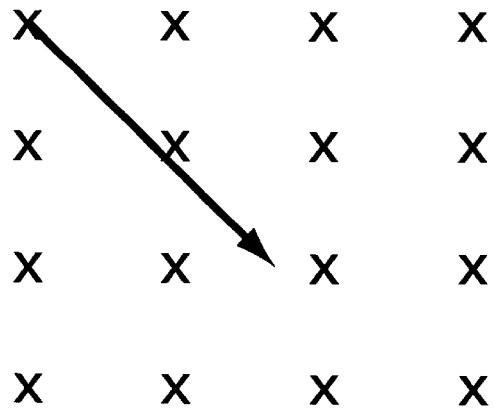
FIG. 4B is a graphical description of a scaled version of the 8×8 non-interlaced pixel block and associated motion vector of FIG. 4A.

FIG. 4A is graphical depiction of an 8×8 non-interlaced pixel block having an associated frame-prediction mode motion vector. FIG. 4B is a graphical description of a scaled version (SCALE FACTOR=2) of the 8×8 non-interlaced pixel block (i.e., a 4×4 non-interlaced pixel block) and associated motion vector of FIG. 4A. The motion vector associated with the 8×8 pixel block of FIG. 4A has a horizontal displacement of 3.5 pixels, and a vertical displacement of four lines. The corresponding scaled motion vector of FIG. 4B has, appropriately, a horizontal displacement of 1.75 pixels, and a vertical displacement of two lines. Thus, both pixel and motion vector information have scaled appropriately in the representations of FIG. 4A and FIG. 4B.

Figure 1:
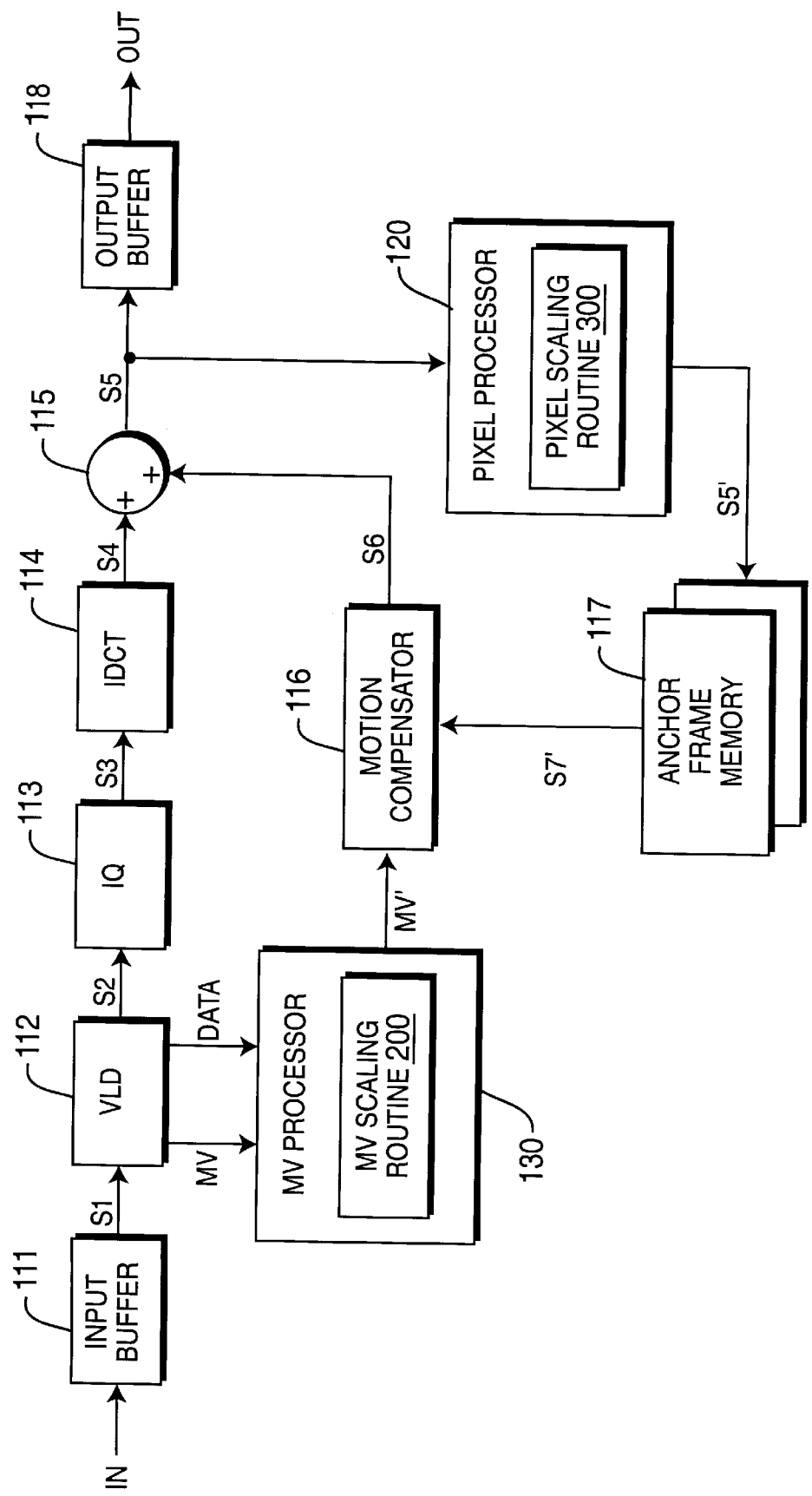
FIG. 1 depicts an embodiment of an MPEG-like decoder according to the invention.

As depicted in above with respect to FIG. 4A and FIG. 4B, if the only prediction mode is used is a frame prediction mode, than the same scaling factor is used to scale the reference pixel blocks and the motion vectors used to form predicted pixel blocks using the scaled reference blocks (e.g., by the motion compensation module 116 of FIG. 1).

Figure 5A:
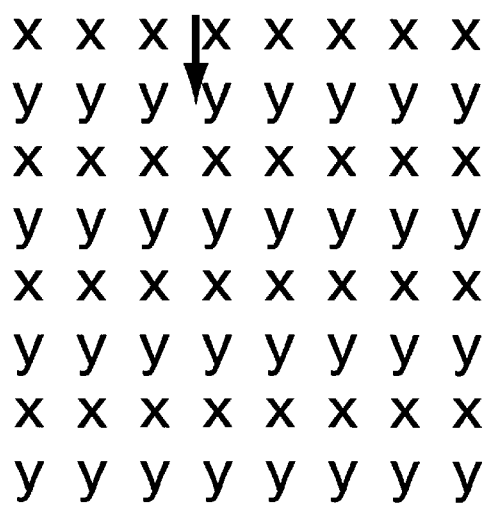
FIG. 5A is graphical depiction of an 8×8 interlaced pixel block having an associated field-prediction mode motion vector.
Figure 5:
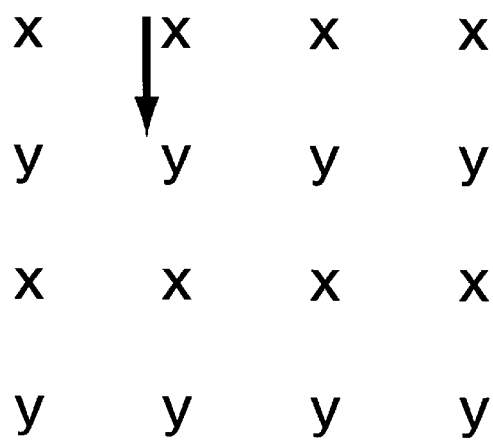
FIG. 5B is a graphical description of a scaled version of the 8×8 interlaced pixel block and associated motion vector of FIG. 5A.

FIG. 5A is graphical depiction of an 8×8 interlaced pixel block having an associated field-prediction mode motion vector. FIG. 5B is a graphical description of a scaled version (SCALE FACTOR=2) of the 8×8 interlaced pixel block (i.e., a 4×4 interlaced pixel block) and associated motion vector of FIG. 5A. The motion vector associated with the 8×8 pixel block of FIG. 5A comprises a (0,0) motion vector. That is, the motion vector points from the first line in the first field to the first line in the second field. Furthermore, since the motion vector is coded as a (0,0) motion vector, a simple scaling of the motion vector will result in a value of zero. That is, the resulting scaled motion vector will also be a (0,0) motion vector.

When using the scaled (0,0) motion vector to predict the motion of a scaled macroblock, the resulting prediction will be incorrect. This is because the scaled motion vector will point from the first line in the first field to the first line in the second field. However, since the macroblock has been scaled, it is likely that the motion vector should point to a different line.

Referring now to FIG. 5B (a 2:1 scaled version of FIG. 5A), the pixel domain information has been properly scaled, but the (0,0) motion vector value is representative of an incorrect vertical displacement of the motion vector. If properly interpreted, the scaled motion vector value would result in a motion vector that pointed to a half-pel above the first line of the second field. However, since a (0,0) motion vector was scaled, resulting in a (0,0) motion vector, the scaled motion vector points to the first line in the second field. Thus, in attempting to scale the motion vector by a factor of two, the vertical displacement parameter of the motion vector has been effectively doubled. As such, the scaled motion vector is not appropriate to the scaled pixel information. As such, any predictions using this motion vector will result in, e.g., undesirable visual artifacts upon presentation of the decoded images.

In view of the foregoing discussion, it can be readily appreciated that, in the case of inter-field motion vector prediction, the "divide by 2" approach or, more generally, the "scale motion vectors as the pixel information is scaled" approach, results in a vertical displacement shift proportional to the scaling ratio used, and which depends of the parity of the source and destination fields. That is, in the case of 2:1 compression, such as depicted in FIGS. 5A and 5B, a one line shift of the "actual" motion vector occurs.

This same shifting by an appropriate constant factor will occur when resizing any motion vector within the context of inter-field motion vector prediction.

To compensate for this shifting of motion vectors when using interfield motion vector prediction, the present invention utilizes a scaling factor representative of the ratio between the two sampling distances. For example, in the case of a scaling factor of two (i.e., 2:1 compression), the vertical component of the motion vector is resized such that the appropriate scaled vertical displacement of the motion vector is utilized.

It is important to note that the vertical displacement shift described above differs for motion vectors pointing from top fields to bottom fields and from motion vectors pointing from bottom fields to top fields. That is, in a case of a motion vector pointing from a top field to a bottom field, a scaled motion vector will have a positive shift in vertical displacement. Therefore, for the case of a motion vector pointing from a top field to a bottom field, in addition to scaling the motion vector according to the pixel scaling factor, the positive vertical displacement must be offset. Similarly, in a case of a motion vector pointing from a bottom field to a top field, the scaled motion vector will have a negative vertical displacement. Therefore, for the case of a motion vector pointing from a bottom field to a top field, in addition to scaling the motion vector according to the pixel scaling factor, the negative vertical displacement must be offset.

FIG. 1 depicts an embodiment of an MPEG-like decoder 100 according to the invention. Specifically, the decoder 100 of FIG. 1 receives and decodes a compressed video information stream IN to produce a video output stream OUT. The video output stream OUT is suitable for coupling to, e.g., a display driver circuit within a presentation device (not shown).

The MPEG-like decoder 100 comprises an input buffer memory module 111, a variable length decoder (VLD) module 112, an inverse quantizer (IQ) module 113, an inverse discrete cosine transform (IDCT) module 114, a summer 115, a motion compensation module 116, an output buffer module 118, an anchor frame memory module 117, a pixel processor 120 and a motion vector (MV) processor 130.

The input buffer memory module 111 receives the compressed video stream IN, illustratively a variable length encoded bitstream representing, e.g., a high definition television signal (HDTV) or standard definition television signal (SDTV) output from a transport demultiplexer/decoder circuit (not shown). The input buffer memory module 111 is used to temporarily store the received compressed video stream IN until the variable length decoder module 112 is ready to accept the video data for processing. The VLD 112 has an input coupled to a data output of the input buffer memory module 111 to retrieve, e.g., the stored variable length encoded video data as data stream S1.

The VLD 112 decodes the retrieved data to produce a constant length bit stream S2 comprising quantized prediction error DCT coefficients, a motion vector stream MV and a block information stream DATA. The IQ module 113 performs an inverse quantization operation upon constant length bit stream S2 to produce a bit stream S3 comprising quantized prediction error coefficients in standard form. The IDCT module 114 performs an inverse discrete cosine transform operation upon bit stream S3 to produce a bitstream S4 comprising pixel-by-pixel prediction errors.

The summer 115 adds the pixel-by-pixel prediction error stream S4 to a motion compensated predicted pixel value stream S6 produced by the motion compensation module 116. Thus, the output of summer 115 is, in the exemplary embodiment, a video stream S5 comprising reconstructed pixel values. The video stream S5 produced by summer 115 is coupled to the pixel processor 120 and the output buffer module 118.

The pixel processor 120 compresses the video stream S5 according to a scaling factor SF to produce a compressed video stream S5' having a compression ration of 1:SF. The pixel processor 120 operates on a pixel block by pixel block basis (e.g., a 4×4, 4×8 or 8×8 pixel block) to compress each pixel block forming an anchor frame such that a resulting compressed anchor frame is provided to the anchor frame memory as compressed video stream S5'. Thus, the memory requirements of anchor frame memory module 117 are reduced by a factor of SF.

In one embodiment of the pixel processor 120, a pixel block is compressed by subjecting the pixel block to a discrete cosine transform (DCT) to produce a DCT coefficient block. A portion (typically high order coefficients) of the DCT coefficient block is then truncated. The remaining DCT coefficients are then subjected to an inverse DCT to produce a reduced resolution pixel block. The amount of reduction in resolution is determined by the number of DCT coefficients used to reconstruct the truncated pixel block.

In another embodiment of the pixel processor 120, an 8×8 pixel block is subjected to a DCT process to produce a respective 8×8 DCT coefficient block. If half of the DCT coefficients are truncated, and the remaining DCT coefficients are subjected to the IDCT processing, then the resulting pixel block will have approximately half the resolution (i.e., a 2:1 compression ratio) of the initial pixel block (i.e., a 4×8 or 8×4 pixel block). Similarly, if three fourths of the DCT coefficients are truncated, and the remaining DCT coefficients are subjected to the IDCT processing, then the resulting pixel block will have approximately one fourth the resolution (i.e., a 4:1 compression ratio) of the initial pixel block (i.e., a 4×4 pixel block).

In another embodiment of the pixel processor 120, a decimation or sub-sampling process is used. That is, a particular compression ratio is achieved by selectively removing pixels from an image represented by pixel information within video stream S5. For example, to achieve a 4:1 compression ratio of an image, every other scan line of an image is removed, and every other pixel of the remaining scan lines is removed. In this embodiment, pixel processor 120 operates to sub-sample, or decimate, the pixel information within video stream S5 to effect a resizing (i.e., downsizing) of the video image represented by the pixel data.

The anchor frame memory module 117 receives and stores the compressed video stream. Advantageously, the size of the anchor frame memory module 117 may be reduced by an amount consistent with the compression ratio utilized by the pixel processor 120.

The motion vector processor 130 receives the motion vector stream MV and block information stream DATA from the VLD 112. The motion vector stream MV comprises motion vector information to be used by the motion compensation module 116 to predict individual macroblocks based upon image information stored in the anchor frame memory module. However, since the image information stored in the anchor frame memory module 117 has been scaled by the pixel processing unit 120 as described above, it is also necessary to scale motion vector data used to predict macroblocks using the scaled pixel information. The scaled motion vectors MV are coupled to the motion compensation module 116 via path MV'.

The motion compensation module 116 accesses the compressed (i.e., scaled) image information stored in memory module 117 via signal path S7' and the scaled motion vector(s) MV' to produce a scaled predicted macroblock. That is, the motion compensation module 116 utilizes one or more stored anchor frames (e.g., the reduced resolution pixel blocks generated with respect to the most recent I-frame or P-frame of the video signal produced at the output of the summer 115), and the motion vector(s) MV' received from the motion vector processor 130, to calculate the values for each of a plurality of scaled predicted macroblocks forming a scaled predicted information stream.

Each scaled predicted macroblock is then processed by the motion compensation module 116 or by an inverse pixel processing module (not shown) following the motion compensation module 116 in a manner inverse to the processing of the pixel processor 120. For example, in the case of the pixel processor 120 performing a down-sampling or decimation of the video stream S5 produced by summer 115, the motion compensation module 116 performs an up-sampling or interpolation of the scaled predicted macroblock to produce a full resolution predicted macroblock. Each of the full resolution predicted macroblock are then coupled to an input of adder 115 as motion compensated predicted pixel value stream 56.

Figure 2:
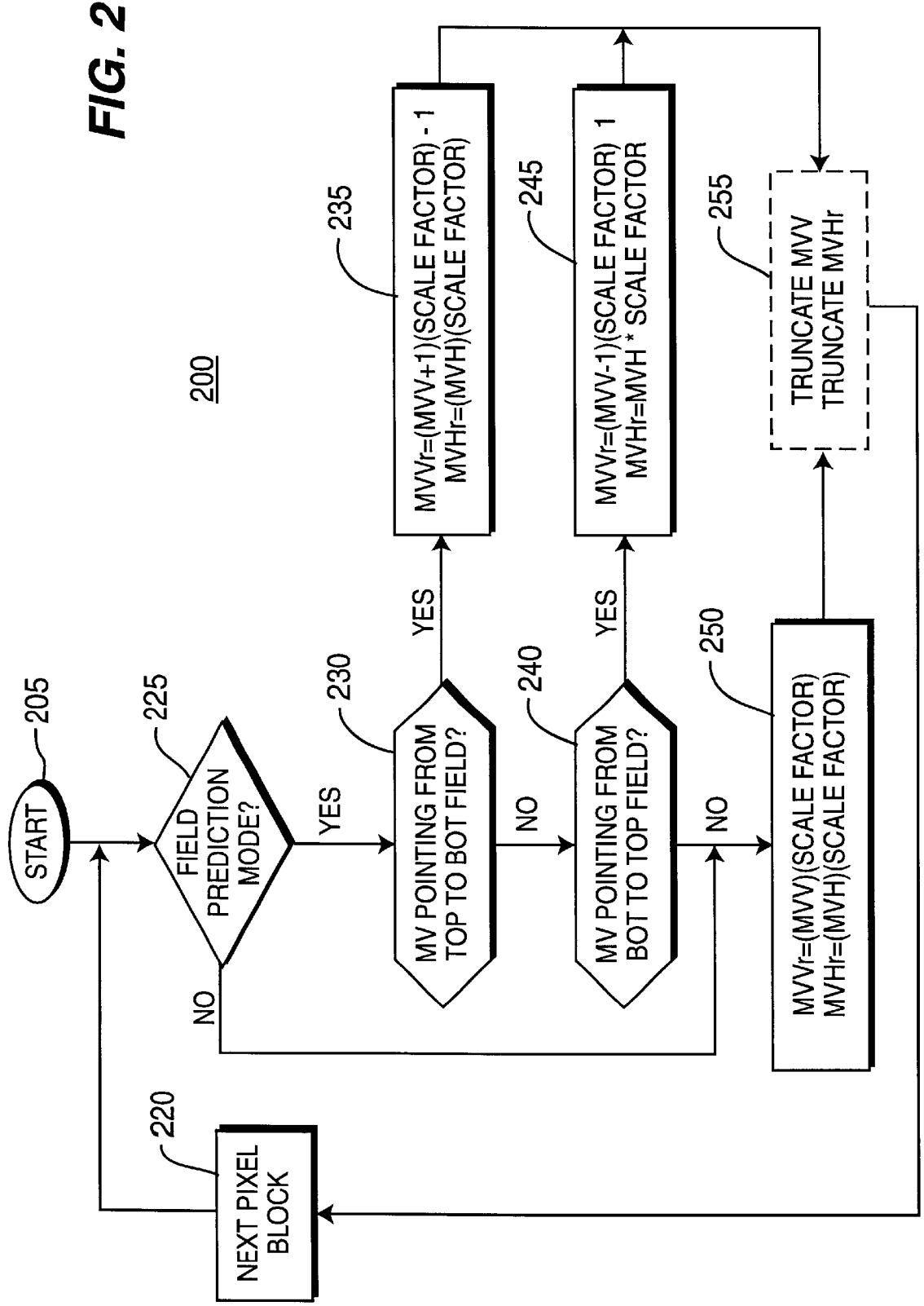
FIG. 2 depicts a flow diagram of a motion vector scaling routine according to the invention and suitable for use in the MPEG-like decoder of FIG. 1.

The operation of the motion vector processor 130 will now be described in more detail with respect to FIG. 2. FIG. 2 depicts a flow diagram of a motion vector scaling routine 200 according to the invention and suitable for use in the MPEG-like decoder 100 of FIG. 1. Specifically, FIG. 2 depicts a flow diagram of a motion vector scaling routine 200 suitable for use in the motion vector processor 130 of the MPEG-like decoder 100 of FIG. 1.

The motion vector scaling routine 200 operates to scale motion vectors associated with a predicted frame (i.e., a P-frame or B-frame) to be processed by the motion compensation module 116. As previously discussed, to properly reconstruct a predicted macroblock using such a reduced resolution anchor frame, it is necessary to appropriately scale the motion vectors associated with the predicted macroblock. The motion vector scaling routine 200 adaptively scales the motion vector(s) in response to the scaling factor used by the pixel processor 120 and the type of motion compensation (i.e., frame mode, intra-field mode or inter-field mode) originally used to from the predicted macroblock.

The motion vector scaling routine 200 is entered at step 205, when, e.g., a predicted macroblock to be decoded is received by the variable length decoder 112, which responsively extracts motion vector(s) MV and motion vector mode information DATA from the received macroblock. The motion vector(s) MV and motion vector mode information DATA is coupled to the motion vector processor 130, as previously described. The routine 200 then proceeds to step 225.

At step 225 a query is made as to whether the motion vector(s) MV associated with the received macroblock are associated with a field prediction mode. That is, a query is made as to whether motion vector mode information DATA identifies the prediction methodology used for the received macroblock as the field prediction mode. For example, in the case of an MPEG-2 macroblock, a field-motion-type field within a header portion of the macroblock may be examined. If the query at step 225 is answered negatively, then the routine 200 proceeds to step 250. If the query at step 225 is answered affirmatively, then the routine 200 proceeds to step 230.

At step 250 the vertical and horizontal displacement components of the received motion vector(s) are scaled per equations 1 and 2 (below), where:

MVV is the vertical displacement component of the received motion vector;

MVH is the horizontal displacement component of the received motion vector;

MVVr is the scaled vertical displacement component of the motion vector;

MVHr is the scaled horizontal displacement component of the motion vector; and

SCALE FACTOR is the scaling factor used by, e.g., pixel processor 120 to scale the pixel blocks forming the reference frame. After scaling the vertical and horizontal displacement components of the received motion vector(s) per equations 1 and 2, the routine 200 proceeds to step 255.

$$MVVr = MVV \times SCALEFACTOR \quad \text{(equation 1)}$$

$$MVHr = MVH \times SCALEFACTOR \quad \text{(equation 2)}$$

At step 230 a query is made as to whether the received motion vector information comprises a motion vector pointing from a top field to a bottom field. If the query at step 230 is answered negatively, then the routine 200 proceeds to step 240. If the query at step 230 is answered affirmatively, then the routine 200 proceeds to step 235, where the vertical and horizontal displacement components of the received motion vector(s) are scaled per equations 3 (below) and 2 (above). The routine 200 then proceeds to optional step 255.

$$MVVrV = [(MVV+1) \times (SCALEFACTOR)] - 1 \quad \text{(equation 3)}$$

At step 240 a query is made as to whether the received motion vector information comprises a motion vector pointing from a bottom field to a top field. If the query at step 240 is answered negatively, then the routine 200 proceeds to step 250. If the query at step 240 is answered affirmatively, then the routine 200 proceeds to step 245, where the vertical and horizontal displacement components of the received motion vector(s) are scaled per equations 4 (below) and 2 (above). The routine 200 then proceeds to optional step 255.

$$MVVr = [(MVV-1) \times (SCALEFACTOR)] + 1 \quad \text{(equation 4)}$$

At optional step 255 the scaled vertical (MVVr) and horizontal (MVHr) displacement components of the received motion vector(s) are truncated to conform to, e.g., the half pel resolution of an MPEG-like decoding system. Alternatively, the MPEG-like decoder may keep the increased resolution of the motion vectors by utilizing a finer prediction grid or coordinate system. The routine 200 then proceeds to step 220, to await reception of the next predicted pixel block by the VLD 112.

Figure 3A:
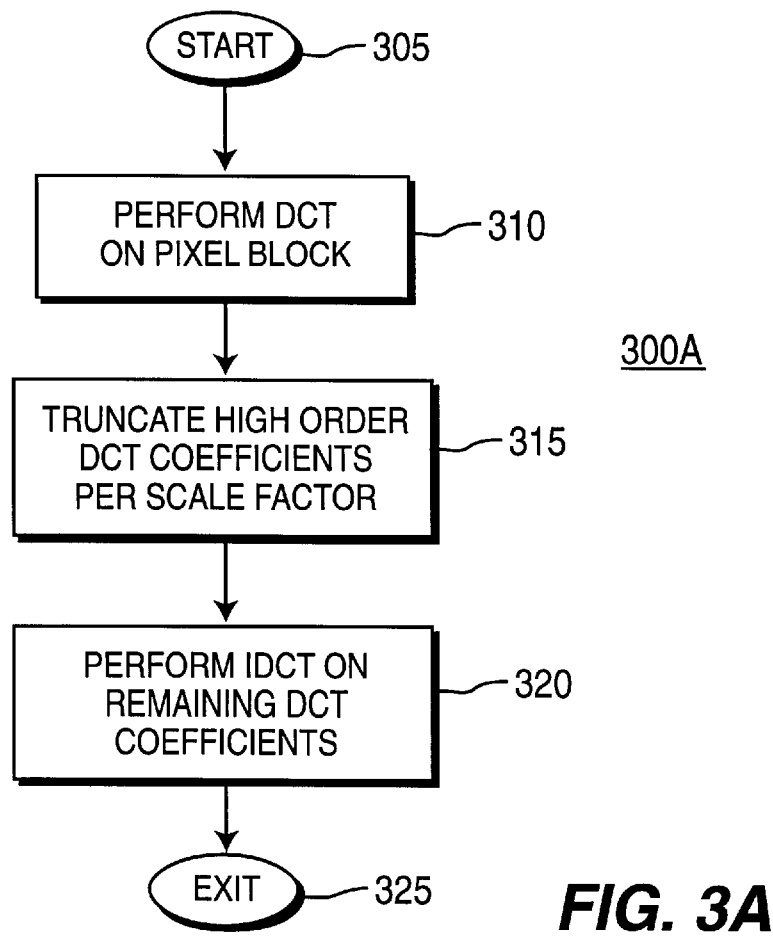
FIG. 3A and FIG. 3B are flow diagrams of image compression routines suitable for use in the MPEG-like decoder of FIG. 1.

FIG. 3A depicts a pixel scaling routine 300A suitable for use in the pixel processor 120 of FIG. 1. The pixel scaling routine 300A is entered at step 305, when a pixel block, illustratively an 8×8 pixel block is received by pixel processor 120 via video stream S5. The routine 300A then proceeds to step 310, where a discrete cosine transform (DCT) is performed on the received pixel block. For example, in the case of an 8×8 pixel block, a two dimensional DCT (or a plurality of one dimensional DCTs) is performed on the received pixel block to produce an 8×8 DCT coefficient block. The routine 300A then proceeds to step 315.

At step 315 a plurality of DCT coefficients are truncated per the scaling factor. Thus, in the case of a scaling factor of two (i.e., 2:1 compression) half of the DCT coefficient (typically the higher order DCT coefficients) are truncated. Similarly, in the case of a scaling factor of four (i.e., 4:1 compression) three fourths of the (higher order) DCT coefficients are truncated. The routine 300A then proceeds to step 320.

At step 320 an inverse DCT is performed on the remaining DCT coefficients to produce a reconstructed pixel block comprising a subset of the pixel information within the received pixel block. For example, in the case of an 8×8 pixel block undergoing 2:1 compression, the 32 DCT coefficients representing the higher vertical or horizontal spatial frequency information of the received pixel block are truncated at step 315. The remaining 32 DCT coefficients are subjected to the IDCT processing at step 320 to produce a 32 pixel block (i.e., a 4×8 or 8×4 pixel block). In a case of 4:1 compression of a received 8×8 pixel block, where all DCT coefficients except the 16 lower frequency DCT coefficients truncated, the 16 DCT coefficients representing the lower vertical and horizontal spatial frequency information of the received pixel block are subjected to an inverse DCT process to produce a 4×4 pixel block. The routine 300A then proceeds to step 325, where it is exited.

Figure 3B:
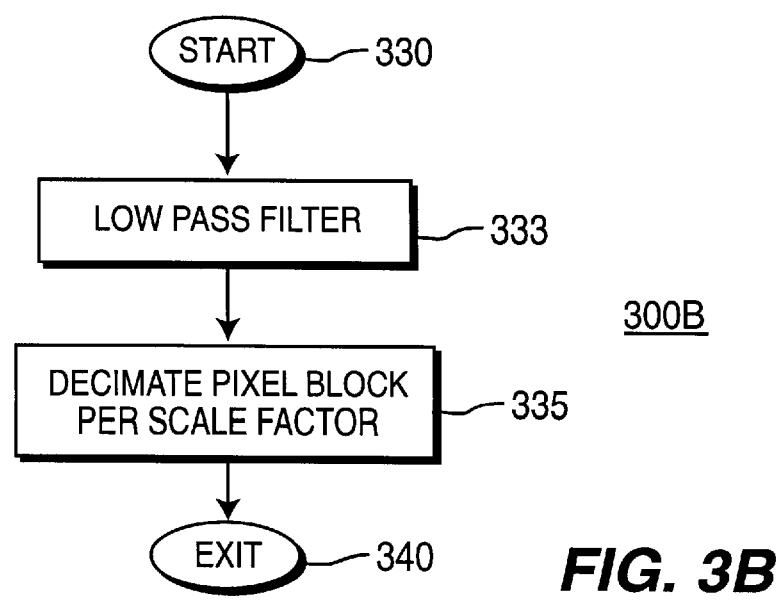

FIG. 3B represents an alternate embodiment of the pixel scaling routine 300 of pixel processor 120. Specifically, the routine 300b of FIG. 3B is entered at step 330, when a pixel block is received by pixel processor 120. The routine 300B proceeds to step 333, where the received pixel block is low pass filtered, and to step 335, where the received pixel block is decimated or sub-sampled according to the scale factor to achieve an appropriate compression ratio. For example, pixels and/or lines of pixels are deleted from the video information stream S5 to produce a reduced pixel (i.e., compressed) video stream S5.

While the invention has been described primarily in terms of scaling motion vectors and pixel domain information by a factor of two, it must be noted that the invention is well suited to other scaling factors (integer and non-integer).

Moreover, while the invention has been described primarily in terms of scaling down (i.e., reducing pixel domain information prior to storage), the invention is well suited to scaling up (i.e., increasing pixel domain information). Such scaling up of pixel domain information and motion vector information is especially applicable to applications requiring the presentation of low resolution image information using a high resolution display device. For example, the presentation of standard definition television (SDTV) on a high definition television (HDTV) display device.

One skilled in the art and informed by the teachings of the present invention will readily devise additional and various modifications to the above-described embodiments of the invention.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. A method for adapting motion vector information to a scaling factor associated with scaled pixel block reference information, said method comprising the steps of:
   identifying an encoding mode of a predicted pixel block;
   scaling, using said scaling factor, a horizontal displacement parameter of each motion vector associated with said predicted pixel block; and
   in the case of a field prediction encoding mode including an inter-field motion vector prediction:
      imparting, to a vertical displacement parameter of said motion vector associated with said predicted pixel block, a first offset;
      scaling, using said scaling factor, said offset vertical displacement parameter; and
      imparting, to said scaled offset vertical displacement parameter, a second offset, wherein: if said inter-field motion vector prediction comprises
      a top field prediction into a bottom field, said first offset comprises a positive offset; and
      if said inter-field motion vector prediction comprises a bottom field prediction into a top field, said first offset comprises a negative offset.

2. The method of claim 1, further comprising the step of:
   in the case of a field prediction encoding mode not including an inter-field motion vector prediction:
      scaling, using said scaling factor, said vertical displacement parameter of said motion vector associated with said predicted pixel block.

3. The method of claim 1, wherein said first and second offsets have the same magnitude and opposite polarities.

4. A method for adapting motion vector information to a scaling factor associated with scaled pixel block reference information, comprising the steps of:
   identifying an encoding mode of a predicted pixel block;
   scaling, using said scaling factor, a horizontal displacement parameter of each motion vector associated with said predicted pixel block;
   and
   in the case of a field prediction encoding mode including an interfield motion vector prediction:
      imparting to a vertical displacement parameter of said motion vector associated with said predicted pixel block, a first offset;
      scaling, using said scaling factor, said offset vertical displacement parameter; and
      imparting, to said scaled offset vertical displacement parameter, a second offset; and
      truncating, to a predetermined level of accuracy, said scaled vertical and horizontal displacement parameters.

5. The method of claim 1, wherein said scaled pixel block reference information is produced according to the steps of:
   performing a discrete cosine transform (DCT) operation on an unscaled reference pixel block to produce a corresponding DCT coefficient block;
   truncation a portion of said DCT coefficient block to produce a reduced DCT coefficient block; and
   performing an inverse DCT operation on said reduced DCT coefficient block to produce said scaled pixel block.

6. The method of claim 1, wherein said scaled pixel block reference information is produced according to the steps of:
   low pass filtering an unscaled reference pixel block to produce a reduced frequency reference pixel block; and
   decimating said reduced frequency reference pixel block to produce said scaled pixel block.

7. A method comprising the steps of:
   scaling, by a first factor, a pixel block;
   scaling, by said first factor, a horizontal displacement parameter of a motion vector associated with said pixel block; and
   in the case of a said pixel block being encoded using a field prediction encoding mode including an inter-field motion vector prediction:
      imparting, to a vertical displacement parameter of said motion vector associated with said predicted pixel block, a first offset;
      scaling, using said scaling factor, said offset vertical displacement parameter; and
      imparting, to said scaled offset vertical displacement parameter, a second offset;
   in the case of a said pixel block not being encoded using a field prediction encoding mode including an inter-field motion vector prediction,
   scaling, using said scaling factor, said offset vertical displacement parameter, wherein:
      if said inter-field motion vector prediction comprises a top field prediction into a bottom field, said first offset comprises a positive offset; and
      if said inter-field motion vector prediction comprises a bottom field prediction into a top field, said first offset comprises a negative offset.

8. The method of claim 7, wherein said first and second offsets have the same magnitude and opposite polarities.

9. A method comprising the steps of:

scaling, by a first factor, a pixel block;

scaling, by said first factor, a horizontal displacement parameter of a motion vector associated with said pixel block; and in the case of a said pixel block being encoded using a field prediction encoding mode including an inter-field motion vector prediction:

imparting, to a vertical displacement parameter of said motion vector associated with said predicted pixel block, a first offset;

scaling, using said scaling factor, said offset vertical displacement parameter; and imparting, to said scaled offset vertical displacement parameter, a second offset;

in the case of a said pixel block not being encoded using a field prediction encoding mode including an inter-field motion vector prediction, scaling, using said scaling factor, said offset vertical displacement parameter; and truncating, to a predetermined level of accuracy, said scaled vertical and horizontal displacement parameters.

10. The method of claim 7, wherein said scaled pixel block reference information is produced according to the steps of:

performing a discrete cosine transform (DCT) operation on an unscaled reference pixel block to produce a corresponding DCT coefficient block, truncation a portion of said DCT coefficient block to produce a reduced DCT coefficient block; and performing an inverse DCT operation on said reduced DCT coefficient block to produce said scaled pixel block.

11. The method of claim 7, wherein said scaled pixel block reference information is produced according to the steps of:

low pass filtering an unscaled reference pixel block to produce a reduced frequency reference pixel block; and decimating said reduced frequency reference pixel block to produce said scaled pixel block.

12. An apparatus comprising:

a pixel processor, for receiving decoded reference pixel blocks and producing therefrom scaled reference pixel blocks according to a scaling factor; and a motion vector processor, for receiving motion vector information associated with a predicted pixel block and producing therefrom a scaled motion vector according to said scaling factor; wherein said motion vector processor, in the case of a said pixel blocks being encoded using a field prediction encoding mode including an inter-field motion vector prediction, scaling said motion vector information associated with said predicted pixel block by imparting a first offset to a vertical displacement parameter of said motion vector, scaling said vertical displacement parameter and a horizontal displacement parameter of said motion vector according to said scaling factor, and imparting, to said scaled offset vertical displacement parameter, a second offset, wherein:

if said inter-field motion vector prediction comprises a top field prediction into a bottom field, said first offset comprises a positive offset; and if said inter-field motion vector prediction comprises a bottom field prediction into a top field, said first offset comprises a negative offset.

13. An apparatus comprising:

a pixel processor, for receiving decoded reference pixel blocks and producing therefrom scaled reference pixel blocks according to a scaling factor; and a motion vector processor, for receiving motion vector information associated with a predicted pixel block and producing therefrom a scaled motion vector according to said scaling factor; wherein said motion vector processor, in the case of a said pixel blocks being encoded using a field prediction encoding mode including an inter-field motion vector prediction, scaling said motion vector information associated with said predicted pixel block by imparting a first offset to a vertical displacement parameter of said motion vector, scaling said vertical displacement parameter and a horizontal displacement parameter of said motion vector according to said scaling factor, and imparting, to said scaled offset vertical displacement parameter, a second offset, wherein: said motion vector processor, in the case of a said pixel blocks not being encoded using a field prediction encoding mode including an inter-field motion vector prediction, scaling said motion vector information associated with said predicted pixel block by scaling said vertical displacement parameter of said motion vector and said horizontal displacement parameter of said motion vector according to said scaling factor.

14. The apparatus of claim 12, wherein:

said first and second offsets have the same magnitude and opposite polarities.

\* \* \* \* \*

UNITED STATES PATENT AND TRADEMARK OFFICE
CERTIFICATE OF CORRECTION

PATENT NO. : 6,310,919 B1
DATED : October 30, 2001
INVENTOR(S) : Florencio

It is certified that error appears in the above-identified patent and that said Letters Patent is hereby corrected as shown below:

<u>Column 7,</u>
Line 60, please replace "MVVrV" with -- MVVr --.

<u>Column 8,</u>
Line 63, please replace "S5" with -- S5' --.

<u>Column 11,</u>
Line 29, please replace "block," with -- block; --.

Signed and Sealed this

Fourteenth Day of May, 2002

Attest:

JAMES E. ROGAN
*Attesting Officer*     *Director of the United States Patent and Trademark Office*